(12) United States Patent
Buschmann (10) Patent No.: US 11,345,235 B2
(45) Date of Patent: May 31, 2022

(54) CONSTRUCTION MACHINE WITH OPERATING PARAMETER SENSOR

(71) Applicant: JOSEPH VOEGELE AG, Ludwigshafen/Rhein (DE)

(72) Inventor: Martin Buschmann, Neustadt (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 170 days.

(21) Appl. No.: 16/357,799

(22) Filed: Mar. 19, 2019

(65) Prior Publication Data

US 2019/0283583 A1 Sep. 19, 2019

(30) Foreign Application Priority Data

Mar. 19, 2018 (EP) .................................... 18162455

(51) Int. Cl.
*B60K 35/00* (2006.01)
*B60R 1/00* (2022.01)
(Continued)

(52) U.S. Cl.
CPC ................ *B60K 35/00* (2013.01); *B60R 1/00* (2013.01); *E01C 19/48* (2013.01); *E01C 19/4873* (2013.01); *G02B 27/017* (2013.01); *G06F 1/163* (2013.01); *G06F 3/011* (2013.01); *G06F 3/04847* (2013.01); *G07C 3/06* (2013.01); *B60K 2370/1438* (2019.05); *B60K 2370/21* (2019.05); *B60K 2370/31* (2019.05);
(Continued)

(58) Field of Classification Search
CPC ..... B60K 35/00; B60R 1/00; B60R 2300/302; E01C 19/4873; E01C 2301/10; G07C 3/06
See application file for complete search history.

(56) References Cited

U.S. PATENT DOCUMENTS 5,921,708 A 7/1999 Grundl et al.
6,826,465 B2† 11/2004 Ishimoto
(Continued)

FOREIGN PATENT DOCUMENTS

CN 1181438 A 5/1998
CN 101892623 A 11/2010
(Continued)

OTHER PUBLICATIONS

European Communication dated Apr. 30, 2020 (with English Machine Translation), Application No. 18 162 455.2-1002, Applicant Joseph Voegele AG, 10 Pages.
(Continued)

*Primary Examiner* — Russell Frejd
*Assistant Examiner* — Brittany Renee Peko
(74) *Attorney, Agent, or Firm* — Brooks Kushman P.C.

(57) ABSTRACT

A construction machine for building or finishing a road, such as a road finisher, comprises at least a working equipment, a display unit and a plurality of sensors. Each sensor is adapted to measure a value of an operating parameter of the construction machine. The sensors are adapted to output data corresponding to the measured values to the display unit, and the display unit is adapted to output a representation of at least a part of the construction machine together with the measured values of the operating parameters.

23 Claims, 3 Drawing Sheets

(51) Int. Cl.
| | |
|---|---|
| *E01C 19/48* | (2006.01) |
| *G07C 3/06* | (2006.01) |
| *G02B 27/01* | (2006.01) |
| *G06F 1/16* | (2006.01) |
| *G06F 3/01* | (2006.01) |
| *G06F 3/04847* | (2022.01) |

(52) U.S. Cl.
  CPC ..... *B60R 2300/302* (2013.01); *E01C 2301/10* (2013.01); *G02B 2027/014* (2013.01); *G02B 2027/0138* (2013.01); *G02B 2027/0178* (2013.01); *G02B 2027/0183* (2013.01)

(56) References Cited

U.S. PATENT DOCUMENTS

| | | | |
|---|---|---|---|
| 7,103,506 | B2 | 9/2006 | Friedrich et al. |
| 8,337,118 | B2 | 12/2012 | Buschmann et al. |
| 8,918,246 | B2 † | 12/2014 | Friend |
| 9,045,870 | B2 | 6/2015 | Buschmann et al. |
| 9,255,364 | B2 † | 2/2016 | Ichikawa |
| 10,001,783 | B2 | 6/2018 | Zahr |
| 10,761,537 | B1 * | 9/2020 | Ready-Campbell ......... G05D 1/0219 |
| 2013/0271274 | A1 * | 10/2013 | Ebert ............ G08G 1/166 340/435 |
| 2014/0188333 | A1 | 7/2014 | Friend |
| 2015/0063907 | A1 | 3/2015 | Graham et al. |
| 2015/0197900 | A1 | 7/2015 | Ichikawa |
| 2016/0170415 | A1 * | 6/2016 | Zahr ............ G05D 1/0293 701/23 |
| 2018/0144523 | A1 * | 5/2018 | Edelman ......... G06T 11/60 345/633 |
| 2018/0340316 | A1 † | 11/2018 | Izumikawa |
| 2019/0048560 | A1 | 2/2019 | Misaki |
| 2019/0286161 | A1 * | 9/2019 | Katou ............. G05D 1/0289 |
| 2019/0287407 | A1 * | 9/2019 | Branscombe ...... G08G 1/166 |
| 2020/0282919 | A1 * | 9/2020 | Yabe ............... B60R 11/00 |

FOREIGN PATENT DOCUMENTS

| | | |
|---|---|---|
| CN | 202055145 U | 11/2011 |
| CN | 103147379 A | 6/2013 |
| CN | 104520508 A | 4/2015 |
| CN | 106758703 A | 5/2017 |
| DE | 10 2014 018 533 A1 | 6/2016 |
| DE | 10 2015 204 181 A1 | 9/2016 |
| DE | 102015204181 A1 | 9/2016 |
| JP | H0477608 U | 7/1992 |
| JP | 2003514294 A | 4/2003 |
| JP | 2003129413 A | 5/2003 |
| JP | 2013253468 A | 12/2013 |
| JP | 2014095210 A | 5/2014 |
| JP | 2016102312 A | 6/2016 |
| JP | 2016106192 A | 6/2016 |
| JP | 2017525000 A | 8/2017 |
| WO | 2015168716 A1 | 11/2015 |
| WO | 2017183707 A1 | 10/2017 |

OTHER PUBLICATIONS

Japanese Office Action dated May 19, 2020 (with English Machine Translation), Application No. 2019-050837, 6 Pages.
Extended European Search Report dated Sep. 26, 2018, Application No. 18162455.2-1002, Applicant Joseph Voegele AG, 8 Pages.
Chinese Search Report dated Nov. 19, 2020 (with English Machine Translation), Application No. 2019102065696, 6 Pages.
Chinese Office Action dated Nov. 27, 2020 (with English Machine Translation), Application No. 201910206569.6, 16 Pages.
Chinese Second Office Action (with English Translation) dated Jul. 20, 2021, Application No. 201910206569.6, Applicant Joseph Voegele AG, 12 Pages.

\* cited by examiner
† cited by third party

CONSTRUCTION MACHINE WITH OPERATING PARAMETER SENSOR

CROSS-REFERENCE TO RELATED APPLICATIONS

This application claims foreign priority benefits under 35 U.S.C. § 119(a)-(d) to European patent application number EP 18162455.2, filed Mar. 19, 2018, which is incorporated by reference in its entirety.

TECHNICAL FIELD

The present disclosure refers to a construction machine for building and/or finishing a road, such as a road finisher, and a method for displaying operating parameters of a construction machine for building and/or finishing a road.

BACKGROUND

Construction machines for the building or finishing of roads are sufficiently well known from the state of the art. These can be, for example, road finishers that can spread a material, such as asphalt, onto the road and compact it. Compactors that usually follow a road finisher in the direction of movement are also such construction machines. They also include feeder vehicles that can feed a road finisher with an asphalt mix or other material for road construction. Combinations of these vehicles can also be understood as construction machines.

When operating these construction machines, a great amount of information is generated with regard to the environment but also with regard to the operation of the construction machine.

Using the example of the road finisher, information on the position of the road finisher relative to the edge of the road for instance accrues. In addition, information regarding ambient temperature or humidity can become relevant. The temperature of the road surface in front of and behind the road finisher is of great importance. This is also related to the temperature in the road finisher's material hopper or the temperature of the paving material (asphalt mix or similar) in the material hopper.

Operating parameters that affect the condition of the construction machine can also be relevant. For example, when operating the road finisher, it is important to know the angle of attack or the height of the paving screed and thus the setting of the leveling cylinders. The transport speed of the scraper conveyors, which feed material from the material hopper to the spreading auger, can also be relevant. Other sizes may also be of interest to the road finisher operator.

A large amount of this data is already generated during operation of the construction machine and is frequently stored for analysis purposes and evaluated at a later point in time if necessary. It is also known, for example, that monitoring devices are provided for the paving screed heating system, which can output the current operating status (heating switched on or off).

The large amount of incoming data from the environment and also from different equipment of the construction machine is usually not accessible to an operator and, if it is, difficult to process. In particular, there is a risk that a driver of the construction machine may be distracted from the actual operation of the construction machine and, in particular, from driving the construction machine by the large amount of information or data that may be received, which may increase the risk of an accident.

SUMMARY

Thus, on the basis of the known state of the art, an object to be solved is to provide a construction machine and a method for displaying the operating parameters of the construction machine, which will enable the driver or other operator to obtain information on the various operating parameters of the construction machine in the simplest and most comprehensible way possible, thus ensuring that road works are carried out correctly and minimizing the risk of accidents.

This object is solved by a construction machine according to the disclosure for building or finishing a road or a method according to the disclosure for displaying operating parameters of a construction machine.

The construction machine according to the disclosure for building and/or finishing a road, such as a road finisher, comprises at least a working equipment, a display unit and a plurality of sensors, each sensor being adapted to measure a value of an operating parameter of the construction machine, wherein the sensors are adapted to output data corresponding to the measured values to the display unit and the display unit is adapted to output a representation of at least a part of the construction machine together with the measured values of the operating parameters.

The working equipment of the construction machine means a device used for constructing and/or finishing a road. This includes, for example, the screed of a road finisher but also the material hopper in which the material for road construction is stored. This also includes other equipment, such as the drive of the construction machine.

The plurality of sensors consists of at least two sensors, which then preferably measure two different operating parameters. An operating parameter is defined as a value or information characteristic of the operation of the construction machine or working equipment, or of the movement of the construction machine, or of characteristics of the environment. These include, for example, the speed and position of the finishing machine, but also the output rate of paving material for the road, or the quantity or temperature of paving material stored in the material hopper. Other operating parameters, such as the temperature (heating) of the paving screed or the angle of inclination of the paving screed, the transport speed of the scraper conveyors, etc., are also included. Similarly, other operating parameters can also be provided for, for example, a compactor driving behind the road finisher or a feeder vehicle (also known as a feeder) to feed the material hopper of a road finisher.

The construction machine does not have to be a single vehicle such as a road finisher or a feeder vehicle, but can also be a vehicle group, for example comprising a road finisher, a compactor driving behind it and a feeder driving in front of it. In addition to the road finisher and/or a roller/compactor and/or the feeder vehicle, other vehicles can also be considered. Trucks can also be considered as part of the vehicle group or as individual "construction machines". The disclosure is not limited in this respect. The trucks can then have the function of feeder vehicles. Instead of the construction machine, the disclosure can also be realized by means of a truck or generally a feeder/feeder vehicle or delivery vehicle (also a truck).

The display unit is advantageously located on the construction machine, but does not have to be permanently connected to it.

The representation of a part of the construction machine together with the measured values of the operating parameters on the display unit is to be understood here in such a way that at least two measured operating parameters or their measured values are displayed together with a part of the construction machine. For example, this means that the paving screed of a road finisher and the compacting pressure of the paving screed or its angle of inclination or height are displayed together with the paving screed on the display unit.

This allows the operator to easily and centrally obtain a wide range of information relevant to the operation of the construction machine by the driver or other operators. This reduces the number of instruments to be monitored by the operator and thus increases road safety while facilitating the operation of the machine.

In one embodiment, the construction machine is intended to include a camera for recording a real-time representation of at least part of the construction machine and transmitting the recorded real-time representation to the display unit. In this embodiment, the image taken permanently by the camera of at least part of the construction machine is thus displayed on the display unit. Of course, this is done according to the disclosure together with the operating parameters. The operator can thus not only be informed about the condition of the construction machine on the basis of the measured values of the operating parameters received, but can also be provided with information at the same time, which the operator can recognize on the basis of the real-time display, but which can only be detected with difficulty by sensors. This further facilitates the operation of the construction machine.

It may also be provided that the operating parameters indicate at least one of the movement of the construction machine, the function of the working equipment, the mode of operation of the working equipment and/or the position of the construction machine in the environment. The function of the working equipment is understood to mean values that characterize the working equipment in its operation, such as the current temperature of the heating system or of the paving screed, or the speed at which a conveyor belt feeds paving material to the material hopper, or the speed at which the scraper conveyors remove material from the material hopper. The operating mode of the working equipment is preferably a property which is also associated with the working equipment, but which is usually static or quasi-static during operation of the working equipment. For example, the finishing width of the paving screed, which is partially adjustable, is an operating parameter that characterizes the operating mode of the working equipment. The operating mode can also be an indication of whether the working equipment is switched on at all. For example, an operating parameter associated with the heating of the screed can be set to "on" or "off" to indicate whether the heating is on (on) or not (off).

It may also be provided that the measured values of the operating parameters of the display of at least part of the construction machine can be superimposed by the display unit. This means that when at least part of the construction machine is displayed, the corresponding operating parameters are superimposed on this display so that a combined display of at least part of the construction machine and the operating parameters takes place. This form of representation can also be described as "mixed reality" or "augmented reality". In this way, the operator can easily assign the displayed measured values, for example, to working equipment of the construction machine.

It can also be provided that the display unit is designed to output at least one target value for at least one of the operating parameters in addition to the measured values of the operating parameters. In particular, this may affect fluctuating operating parameters, such as the temperature of the paving material stored in the material hopper. Here, a target temperature together with the actual temperature (the currently measured value) can be output by the display unit so that the operator or driver of the construction machine can readjust it if necessary. This further simplifies the operation of the construction machine.

In addition, it may be provided that the construction machine is a road finisher and the working equipment is at least one of the drive of the road finisher, the material hopper for receiving material used for road construction, scraper conveyors for transporting the material from the material hopper to a spreading auger, a paving screed, a heating system for the paving screed or a leveling cylinder for adjusting the attachment point of the paving screed, at least one sensor being provided for measuring an operating parameter of the working equipment. The representation of the operating parameter according to the disclosure together with a part of the construction machine can achieve a simplified and easily understandable representation of the operating parameters of the working equipment normally used.

In one embodiment, the display unit is a touch display or virtual reality glasses. The touch display can create further interaction possibilities so that the operator or driver of the construction machine not only receives information, but can also interact with the display unit to control or regulate the construction machine. Virtual reality glasses offer the advantage that the operator is shown the measured values while he can still concentrate on driving the machine, for example, and does not have to look from the road at a separate display. Both embodiments facilitate the operation of the construction machine and increase operational safety. The virtual reality glasses include realizations in the form of head-mounted displays and data glasses, which can be selected according to suitability.

In a further development of this embodiment, the display unit is or includes virtual reality glasses and is designed to display at least one operating parameter of the working equipment when the working equipment is in the field of vision of an operator of the construction machine. If, for example, a road finisher operator walking alongside a road finisher looks at the paving screed of the road finisher, the operator can see information on the heating or leveling cylinder settings, which also determine the paving screed's attachment point. If, on the other hand, the operator looks at the material hopper, he can see information on the temperature of the paving material and the transport speed of the scraper conveyors. This embodiment provides the operator with the information or operating parameters relating to the working equipment he is looking at, so that information that is probably not relevant to the operator at the moment can be hidden.

The method according to the disclosure of displaying operating parameters of a construction machine for building or finishing a road, such as a road finisher, comprises measuring a value of an operating parameter from a plurality of sensors and outputting that value to a display unit, the display unit outputting a representation of at least part of the construction machine together with the measured values of the operating parameters. The operation of the construction machine and the monitoring of its operation can thus be carried out in a compact manner, while in addition safety in road traffic or safety when driving the construction machine can be increased and the construction work can be carried out reliably.

It may be provided that the measured operating parameters are superimposed on the display. In this way, the operator can easily associate a working equipment, for example, with the measured values of the operating parameters.

In an embodiment, the display unit comprises virtual reality glasses and the representation is displayed depending on the operator's field of view and the operating parameters of a working equipment associated with the working equipment when the working equipment is in the operator's field of view, or the operating parameters of the working equipment are displayed in a list area when the working equipment is not in the operator's field of view. As explained above, for example, the paving screed operating parameter(s) can be displayed to the operator when the operator is looking at the paving screed. However, in order to display the other information or measured operating parameters to the operator, an area in the display may include, in the form of virtual reality glasses, a list or table or similar display showing the other operating parameters not related to the operating parameters of the working equipment the operator is looking at. The operator is thus provided with the information he is likely to need, while not losing any information, but still being able to concentrate on operating the machine or driving the machine.

In an alternative embodiment, provision is made for a real-time display of at least part of the construction machine to be recorded by a camera and transmitted to the display unit, wherein the display unit is an interactive touch display and/or wherein the display unit is an at least partially animated display of at least part of the construction machine. Real-time imaging of the condition of the part of the construction machine on the display allows the operator to see, in addition to the operating parameters measured by the sensors, other conditions of the construction machine which are not measured by sensors. This allows a comprehensive but at the same time simple monitoring of the construction machine.

On the other hand, an animated display of at least the part of the construction machine on the display unit can provide improved interaction options, for example by enlarging sections of the display or interacting with them to display additional control options.

In addition to the measured operating parameters, target values of the operating parameters can be displayed. This gives the operator a simple overview of the actual state and possible deviations from the target state of the construction machine.

Furthermore, the display unit may include a control element with which the operator interacts with the display and/or the measured operating parameters to control the construction machine. For example, the control element may be the touch sensitive touch screen of a touch display. But also keyboard and mouse or joystick or other elements can be considered. These operating elements provide an interaction option that allows the operator to centrally influence the operating parameters of the construction machine.

In addition, it may be provided that the construction machine is a road finisher and the working equipment is at least one of the drive of the road finisher, the material hopper for receiving material used for road construction, scraper conveyors for transporting the material from the material hopper to a spreading auger, a paving screed, a heater for the paving screed or a leveling cylinder for adjusting the attachment point of the paving screed, at least one sensor measuring an operating parameter of the working equipment. The method according to the disclosure is thus advantageously implemented for the usual working equipment used by road finishers.

DETAILED DESCRIPTION

Figure 1:
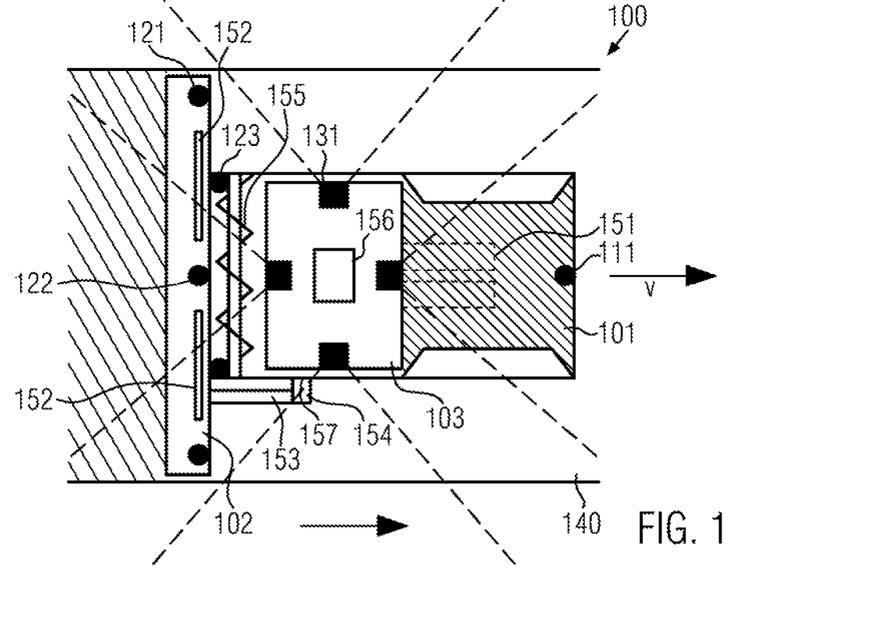
FIG. 1 shows a construction machine according to an embodiment.

FIG. 1 shows a construction machine 100 on a road 140 to be built or finished according to an embodiment of the disclosure. In the embodiment shown here, the construction machine comprises only one vehicle which, in the form shown, is a road finisher. Road finishers are used to apply the road surface to the ground. For example, the road finisher can use up an asphalt mix or concrete mix or other suitable materials.

The road finisher, as the type of construction machine 100, can be designed in the usual way and can be a wheeled road finisher or tracked road finisher with an appropriate drive/motor 156 (diesel engine, electric motor or similar). These vehicles usually comprise a driver's cab 103, a material hopper 101 and a paving screed 102. The material used for paving or finishing the road is stored in the material hopper and fed to the paving screed 102 via scraper conveyors 151, which are shown here only in dashed form, or other suitable equipment at the bottom of the material hopper. In most cases, a spreading auger 155 distributes the material over at least a certain width of the paving screed 102 in order to ensure that the material is spread as evenly as possible on the road. The paving screed is known to include a heating device or heater 152 for heating the material and is held by leveling cylinders 154 and respective connections 153 to the leveling cylinders 154 in a certain position relative to the road surface. The leveling cylinder 154 or its setting defines also the attachment point 157 of the paving screed. The paving screed 102 is usually equipped with compaction units for compacting the material on the road to be paved. A screed relief can also be provided.

The material hopper 101 and the paving screed are examples of a device generally referred to as the "working equipment" 101, 102 with which the construction machine assists in the construction or processing of a road.

In addition to the road finisher 100, other vehicles used in road building can also be considered as construction machines. For example, rollers/compactors and/or feeders can also be used as construction machines. In addition, other vehicles, such as trucks as feeders, can be considered, either individually or in any combination with each other in the form of a vehicle group.

During the operation of such a construction machine, there is usually a lot of information for the driver of the construction machine or an operator running alongside the construction machine. This includes information relating to the construction machine itself, such as its speed or the temperature of the paving screed (heating device 152 of the screed) or the orientation of the paving screed, as well as operating parameters relating to the material hopper and the material it contains. In addition, the driver or operator may be interested in information relating to the road surface in front of the road finisher in the direction of travel or that has been laid by road finisher 100. This includes, for example, the temperature of the ground (so-called "plane") in front of the road finisher and the temperature of the pavement behind the road finisher.

In order to measure this information or general operating parameters, the disclosure provides that the construction machine comprises a plurality, at least two, of sensors for measuring operating parameters. For example, a sensor 111 may be provided which is located in or on the material hopper 101 and measures at least one temperature relevant to the material contained in the material hopper. For example, the sensor 111 can measure the temperature of the near-surface asphalt mix or its core temperature or the temperature of the material in the area of the aforementioned scraper conveyors 151 immediately before this material is fed from the scraper conveyors to the paving screed.

One or more sensors can also be provided to measure the operating parameters of the paving screed. For example, one or more sensors 121 may be provided to measure or record the width of the paving screed if the paving screed is intended to be variable in width. Sensors can also be used to measure the angle of inclination of the paving screed 102 relative to a horizontal plane. In addition, these sensors or another sensor 122 can be used to determine the contact pressure of the compaction units. Sensors 123 can also be used to measure the operating parameters of the spreading auger (rotational speed or similar), for example, or the temperature of the heating system 152 assigned to the paving screed or of a component of the paving screed 102 itself. Sensors can be used in addition or as an alternative, for example to measure the distance between the ends of the paving screed and the road edge. Other sensors can also be used, such as a sensor for measuring the current position of the road finisher or the general position of the construction machine 100 (e.g. GPS sensors).

Sensors can also be provided to measure information or operating parameters relating to the interaction with other machines. For example, a radar sensor can be provided to determine the distance to a feeder, as described in FIG. 2.

Sensors already in use can also be used here. For example, an infrared camera already in use can be used to measure the temperature of the road surface applied.

In addition to these sensors, which measure the operating parameters of the construction machine, one or more cameras 131 (shown as black squares in FIG. 1) can be provided, which record a display, preferably a real-time display in the form of a video or livestream, of the construction machine and/or its surroundings. However, these cameras are not mandatory.

In principle, all sensors already provided in construction machines 100 can be used. In addition, further sensors can be provided in the construction machine 100 according to the disclosure for recording operating parameters that may be regarded as relevant, in order to make it possible to measure the corresponding operating parameters.

In accordance with the disclosure, data corresponding to the measured values of the operating parameters are fed to a display unit to be described below, on which the operating parameters are displayed together with a display of at least part of the construction machine.

Figure 2:
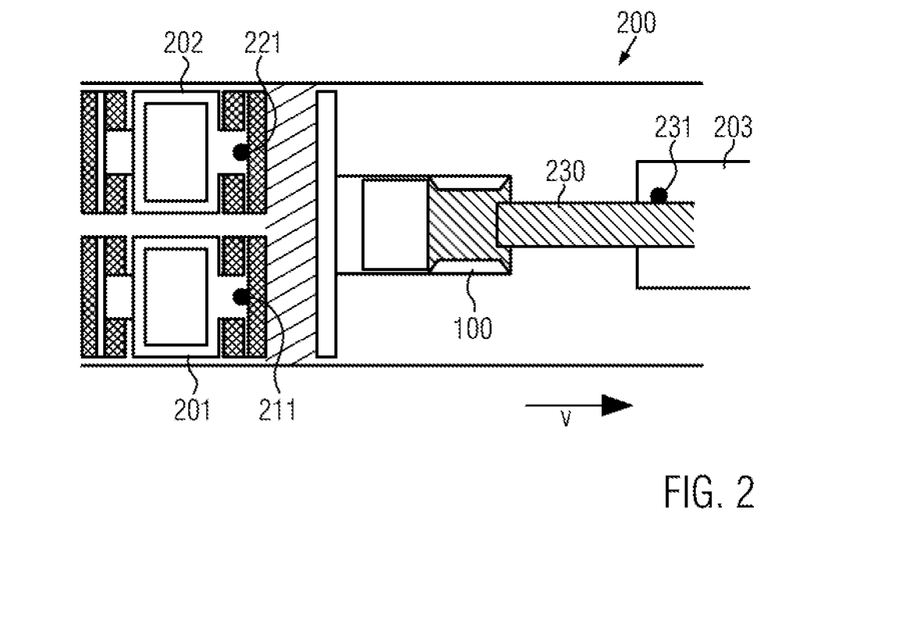
FIG. 2 shows a construction machine comprising a plurality of vehicles according to an embodiment.

FIG. 2 shows another embodiment of a construction machine 200. In this embodiment, the construction machine is formed of a large number of vehicles. In addition to the road finisher 100, as already described in FIG. 1, a feeder vehicle 203 is provided, which can feed an asphalt mixture or other material to be deposited on the road to the material hopper of the road finisher 100 via an endless conveyor belt 230. The feeder vehicle 203 can also include one (or a plurality of) corresponding sensor 231 for measuring an operating parameter, such as the amount of road material fed per time unit (measured, for example, in tons per hour). The data obtained by this sensor, which corresponds to the measured value of the operating parameter, can then also be transferred to the display unit.

In the direction of travel of the construction machine 200 behind the road finisher 100, one or a plurality of compactors 201 and 202 can follow, which compact the road pavement applied by the road finisher 100. Compactors 201 and 202 can, for example, be designed as rollers. Here, too, one or a plurality of sensors 211, 221 can be used to measure the relevant operating parameters, such as the distance to the road finisher, the compacting pressure, the speed or the subgrade temperature. The data corresponding to the measured values of the operating parameters measured by these sensors can also be fed to the display unit.

Figure 3A:
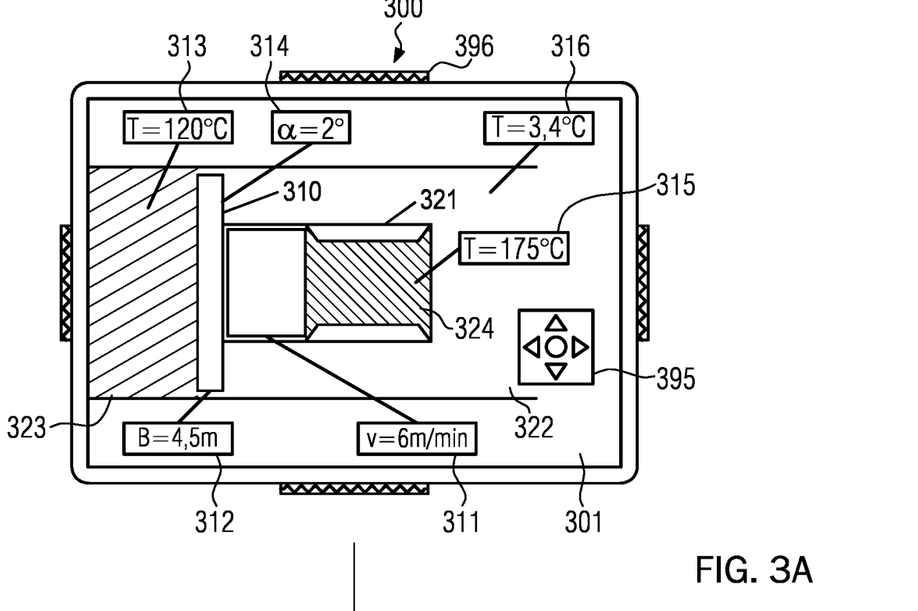
FIGS. 3A to 3C show display units for displaying the operating parameters according to some embodiments.

FIG. 3A shows the first embodiment of a display unit 300 according to the disclosure. In the embodiment shown here, the display unit is initially generally designed as a display or basically as a device for displaying information. The display unit 300 can comprise a touch screen 301 or a similar image output surface. In addition, one or a plurality of operating elements 395 in the form of a keyboard and mouse may be assigned to the display unit 300. Alternatively or additionally, if a touch display is used, the touch display itself can also serve as a touch-sensitive surface for interaction, whereby the control element 395 shown can then be designed as an interactive menu, for example. However, this is not absolutely necessary. In addition, the display unit 300 preferably has means for storing and processing data (processor, memory or similar) or such means are assigned to it. Means for data exchange with the sensors may also be provided. A retainer 396 may be provided for attaching the display unit, for example in the driver's cab or on the construction machine, which, for example, embraces the display unit in the form of a clamp. This retainer may be permanently mounted on or in the construction machine and enable the display unit 300 to be detachably connected to the construction machine.

On the display unit 300 according to the disclosure a display of at least part of the construction machine (in FIG. 3A the road finisher 321) is displayed together with the measured values of the operating parameters.

The display of the part of the construction machine 321 may be either a purely animated (fictitious) display (i.e. not based on real images taken, for example, with the aid of cameras 131 as shown in FIG. 1). Alternatively, the real-time display of the construction machine 100 recorded by the cameras 131 can also be displayed.

In accordance with the disclosure, the operating parameters are displayed in such a way that it is possible for an operator or the driver of the construction machine 100 to assign the operating parameters to the corresponding working equipment (e.g. paving screed, heating system, conveyor belt in the case of a feeder vehicle or similar). For example, operating parameter 312, which affects the entire width of the paving screed, is shown together with paving screed 310. This can be done in the embodiment shown by displaying the value of the measured operating parameter $b=4.5$ m in a box framed superimposing the display of the construction machine and connecting it, for example, with the aid of an arrow, dash or other means, to the relevant working equipment. The same applies to operating parameter 314, which represents the angle of attack of the paving screed through the leveling cylinders at $\alpha=2°$. The temperature of the paving material in the material hopper 324 can also be indicated by means of a corresponding display 315 of the temperature $T=175°$ C. and can be associated with the material hopper in such a way that the operator or driver of the construction machine can see at a glance that this value indicates the temperature of the paving material.

In addition, other operating parameters that do not necessarily affect the road finisher itself can also be displayed. For example, the temperature of the road surface in the direction of travel can be displayed in front of the road finisher 321 by displaying the operating parameter 316 with $T=3.4°$ C. The temperature of the road surface 323 applied directly behind the road finisher can also be displayed in the display 313. The value $T=120°$ C. is given here as an example. In addition, one or more operating parameters can be specified which characterize the movement of the construction machine. In the embodiment shown in FIG. 3A, this has been carried out using the operating parameter 311 with v=6 m/min for the case of speed.

While the described operating parameters are always shown next to the corresponding working equipment or, for example, next to the road surface, it can be seen that the operating parameters can also be shown in the corresponding working equipment or directly superimposed on it. For example, operating parameters 312 and 314 could also be displayed in the area of the paving screed 310. This can be chosen according to the purpose, so that the display allows the operator to assign the measured value of the operating parameter to the entity he describes (e.g. working equipment or road, etc.), but the operator can also read the measured value of the operating parameter without difficulty. In principle, the operating parameters of the display are initially superimposed on a part of the construction machine in the form of mixed reality or augmented reality.

In the embodiment shown in FIG. 3A, only the values of the operating parameters measured by the sensors are shown. However, it can also be advantageous that in addition to these values, which are commonly referred to as "actual values", target values for at least one or some of the operating parameters are displayed. This can be done, for example, by displaying not only the actual value in the framed boxes, but also the target value and, if necessary, even the difference between the two, so that the operator can adapt the working mode or the mode of operation of the construction machine or working equipment accordingly. For example, when building the road, it may be provided that the material to be laid has a temperature of 135° C. This is then the "target value" for the relevant operating parameter. This would be displayed together with the currently measured temperature in field 313. The difference between target value–actual value or actual value–target value can also be displayed in field 313.

While in the previously described embodiments only numerical values were output, which for example were decisive for the movement of the construction machine or operating parameters of the working equipment or construction machine, other embodiments are also conceivable. Thus, it is also possible to display operating parameters that cannot be specified numerically or operating parameters that are usually not specified numerically. This applies, for example, to the heating of the paving screed or the scraper conveyors. Here it can be specified alternatively or in addition to the transport speed of the scraper conveyors, for example, whether they are switched on or off. The same applies to the heating or spreading auger assigned to the paving screed. In addition, error messages or warnings can also be output on the display unit, which are superimposed, for example, on the entire display or at least on part of the display.

While in principle at least a part of the construction machine is shown on the display unit 300, the entire construction machine can also be shown with reference to the road, as shown in FIG. 3A.

Figure 3B:
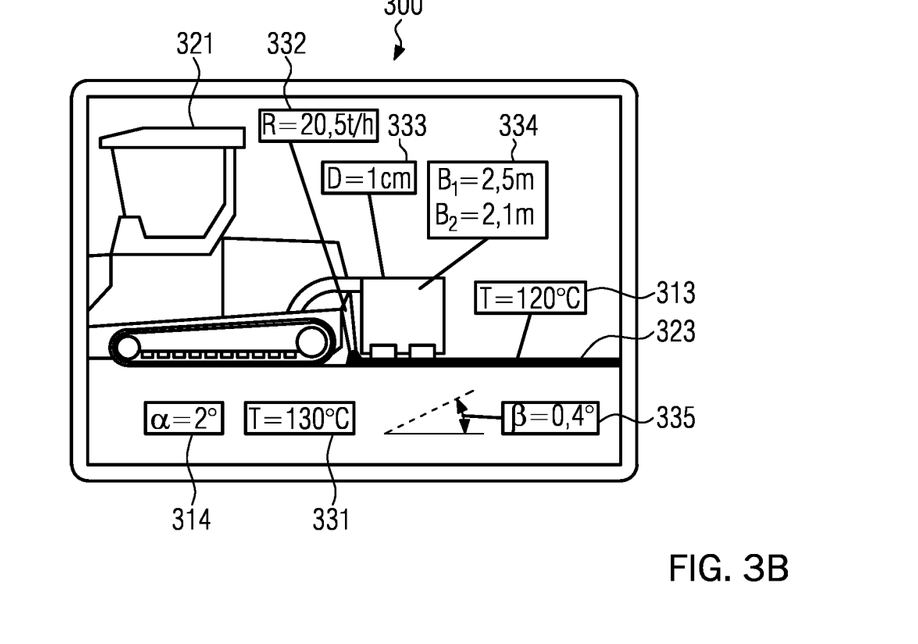

FIG. 3B shows a further embodiment of the display on the display unit. In the embodiment shown here, only a part of the construction machine (here again a road finisher) is shown. For example, the display of the material hopper was essentially omitted here. However, the embodiment shown in FIG. 3B shows the paving screed and more detailed operating parameters relating to the paving screed.

Thus, in addition to the operating parameters 314 and 313 already shown in FIG. 3A, further operating parameters are shown. Operating parameter 331, for example, indicates the temperature of the paving material at $T=130°$ C. directly in the paving screed area. Operating parameter 332 indicates with R=20.5 t/h the throughput or spreading rate achieved by the spreading auger. Operating parameter 334 describes the overall width and/or the width of extendable elements of the paving screed. With conventional road finishers, a pave width of up to 16 meters can be achieved. In this case, it is particularly advantageous if the ends of the paving screed have a certain "sagging" in relation to the center of the paving screed in order to compensate for the buoyancy of these edges on the partially liquid or at least viscous paving material. This sagging can be several centimeters and can also be referred to as operating parameter 333 in this case as D=1 cm. Furthermore, operating parameter 335 can be used to display the angle of inclination of the road surface or of the construction machine 321 to the horizontal (here $\beta=0.4°$), whereas operating parameter 314 $\alpha=2°$, already known from FIG. 3A, can be used to indicate the setting of the leveling cylinder or cylinders.

The specification of the operating parameters according to FIG. 3B is to be understood only exemplary and not conclusively and also not compulsorily. For example, another operating parameter can be specified instead of operating parameter 332. Of course, this also applies to the other operating parameters shown.

From the more general representation in FIG. 3A, an operator of the display unit can get to FIG. 3B, for example, by interacting with the displayed representation of FIG. 3A. The operating elements already described with reference to FIG. 3A can be used for this purpose. For example, if the display unit 300 is equipped with a touch-sensitive touch display 301 (see FIG. 3A), touching the display in the area of the paving screed 310 will take the operator from the representation in FIG. 3A to the representation in FIG. 3B, which shows an enlarged and detailed view of the working equipment (in this example, the paving screed). This is advantageous if the representation in FIG. 3A shows an animated view of the construction machine. In the event that the illustration in FIG. 3A shows a real-time representation of the construction machine with the aid of cameras 131 (see FIG. 1), suitable interaction with the display unit can nevertheless lead to the representation according to FIG. 3B, for example by calling up the more detailed representation according to FIG. 3B via a selection of menu items or by corresponding input with the aid of the input device.

The possibility of switching between a less detailed overall view of the construction machine and a representation of only part of the construction machine (possibly with more operating parameters) with more operating parameters allows the operator to obtain the operating parameters relevant to him at a glance and with as little interaction with the display unit as possible in any situation. This makes operation easier for the operator and, especially when the display unit is used by the driver, can distract him as little as possible from his actual task of controlling the construction machine by interacting with the display unit. This minimizes the risk of accidents.

It goes without saying that the illustrations in FIGS. 3A and 3B are not limited to a road finisher, but can also be used to display other construction machinery used in the building or finishing of roads. For example, the feeder vehicle as shown in FIG. 2 can also be displayed on an appropriate display unit either in addition to the road finisher or alternatively.

For example, the display unit 300 in the form of a display, as shown in FIGS. 3A and 3B, may be fixed in the cab of the construction machine 100. Here it can display the operating parameters not only of the vehicle on which it is mounted, but it can also display the operating parameters of other vehicles such as the feeder or bulldozers as shown in FIG. 2. Thus, as shown in FIG. 2, the driver of the road finisher 100 can be provided with all the necessary information not only about the road finisher itself, but also about other vehicles interacting with the road finisher in order to optimize the operation of the road finisher.

Alternatively or additionally, a display unit can also be provided outside a construction machine in the form of a transportable display, such as a tablet computer. It can also be permanently mounted on the outer casing of the construction machine so that an operator running alongside the construction machine is able to monitor the operating parameters.

It may also be provided that the display unit is designed as a mobile display unit in the form of a tablet computer or similar, but can be attached to corresponding receptacles or holders of a construction machine. With this embodiment, it may then be provided that the display on the display unit, in particular the representation of the construction machine or a part thereof and the displayed operating parameters change depending on whether the construction machine is arranged in a corresponding receptacle or not. It may also be provided that the representation changes depending on the suspension or mounting in which the display unit is arranged.

For example, a receptacle may be provided in the area of the drive of the construction machine 100. If the display unit is placed in this receptacle, the display on the display unit can be changed so that a display of the drive unit and operating parameters relating to the drive/motor and, for example, the sprockets when a road finisher is designed as a tracked road finisher is made. If the display unit is placed in a receptacle in the area of the paving screed, the paving screed may be displayed as described, for example, in FIG. 3B, which may also affect the associated operating parameters.

In this embodiment, the operator's interaction with the display can be further simplified, as the information relevant to the working equipment or part of the machine is always displayed without the need for additional interaction. If the display unit is not located in any receptacle, a general display can be made, for example as shown in FIG. 3A, giving the operator an overview of some of the most relevant operating parameters.

In order for the display unit to recognize in which holder it is arranged and to change the display accordingly, it may be provided that each holder has, for example, an electronic or mechanical identification which can be recognized by the display unit and/or processor unit associated with the display unit, and the processor unit and/or display unit is then adapted to change the display according to the recognized holder and thus according to the position of the display unit. This can be done, for example, by means of RFID identification.

Figure 3C:
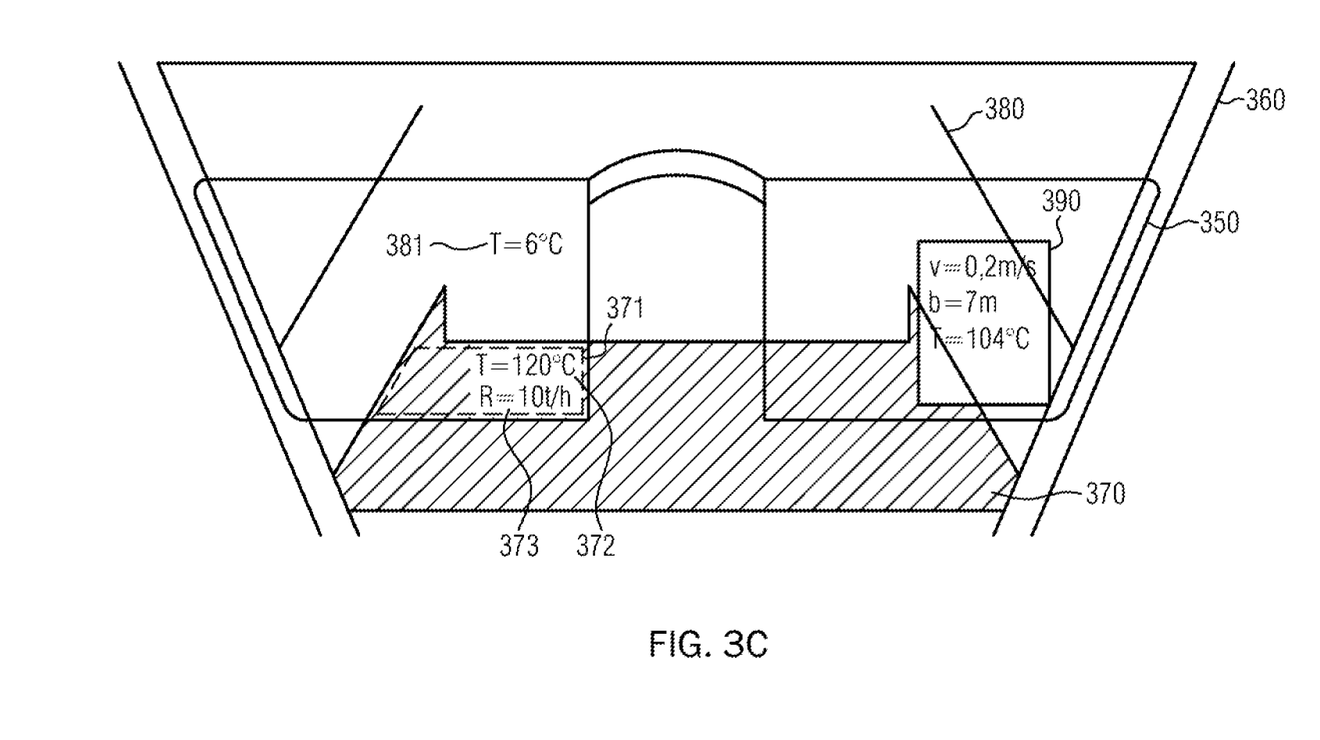

FIG. 3C shows a further embodiment of the display unit 300 in the form of data glasses, also known as virtual reality glasses 350. This can either be designed as a head-mounted display comprising an opaque screen that can be positioned in front of the eyes. Alternatively, it can also be provided that the virtual reality glasses 350 are designed in the form of standard "glasses" with a built-in display in the form of a smart lens or data glasses. In the first embodiment, the characteristics of the virtual reality glasses are comparable to those of the display unit shown in FIGS. 3A and 3B, whereas in the second embodiment, in the form of data glasses, an artificial display, for example with the aid of an animated display or images of the construction machine taken by cameras, is not necessary, and the "display" of at least part of the construction machine is effected by the operator viewing the construction machine through the data glasses, i.e. the display corresponds to the current field of vision of the operator and wearer of the data glasses.

FIG. 3C therefore deals essentially with the embodiment of virtual reality glasses as data glasses and not with the embodiment as head-mounted display, since the essential features have already been described with reference to FIGS. 3A and 3B in this embodiment.

In the embodiment shown in FIG. 3C, an operator looks through the glasses 350 onto a part of the construction machine 360, namely at least a part of the material hopper 370, and also looks onto the road 380 in the direction of travel in front of the construction machine. In the embodiment shown, the operator is shown an area 371 in a lens or on the left-hand side of the data glasses 350, which highlights the material hopper 370 and in which operating parameters 372 (temperature of the paving material) and 373 (throughput of the scraper conveyors per hour R=10 t/h) assigned to the material hopper are displayed. This can be done by known image recognition measures through which the data glasses or a data processing device assigned to them or a processor recognizes the material hopper 370 and assigns the values of the operating parameters measured by the sensors to this material hopper. In addition, the operator can see the road 380 through the data glasses 350, so that the temperature 381 of the road 380 (here with T=6° C.) can also be displayed in the left area of the data glasses.

It goes without saying that other operating parameters can also be displayed here, which do not only affect the material hopper or the road, but also characterize, for example, the paving screed or other working equipment. All operating parameters discussed so far can be taken into consideration. In addition, the corresponding operating parameters must not only be displayed in the left-hand lens or in the left-hand side of the 350 data glasses, but can also be displayed in each of the lenses or on the right-hand side of the 350 data glasses.

The embodiment shown here represents certain operating parameters as a function of the field of view or the viewing direction of the wearer of the data glasses 350. This can also be provided for virtual reality glasses in the form of a head-mounted display. At the same time, however, this means that the operator usually does not see all components or parts of the construction machine and may therefore lack information. Therefore, it can be provided that in a list area 390 of the data glasses (or general virtual reality glasses, since this can also apply to the head-mounted displays) further operating parameters for working equipment or other equipment/components of the construction machine 100 are displayed which are currently not in the operator's field of vision. If, for example, the operator turns his head so that he has the paving screed 102 in his field of vision instead of the material hopper 101, the operating parameters of the paving screed 102 can be displayed in the left lens of the data glasses 350, as explained here as an example for the operating parameters of the material hopper 350. The operating parameters of the material hopper can then be displayed in list area 390. In the embodiment shown here, in which the wearer of the data glasses or the operator sees the material hopper, further operating parameters such as the speed of the construction machine, the pave width of the paving screed or the temperature of the pavement can be displayed in list area 390.

It goes without saying that the virtual reality 350 glasses (regardless of whether they are available as a head-mounted display or as data glasses) can be used to display all the operating parameters already explained. In particular, when using a head-mounted display as virtual reality glasses, it is also possible to display an image analogous to that of the data glasses 350 by displaying a real-time representation of the construction machine on the display, which depends on the operator's field of vision or viewing direction and is generated, for example, by cameras 131, as described with reference to FIG. 1. Despite the opaque screen, the operator can observe the current position in and around the construction machine and at the same time be supplied with the necessary operating parameters for controlling the construction machine.

In principle, the operating parameters are displayed using virtual reality glasses in the form of augmented reality, so that the operating parameters are superimposed on the actual display of the environment, preferably without significantly obstructing the view of the construction machine.

What is claimed is:

1. A construction machine for building or finishing a road, the construction machine comprising:
    a working equipment;
    a display unit; and
    a plurality of sensors, each sensor being configured to measure a value of an operating parameter of the construction machine, the sensors being configured to output data corresponding to the measured values to the display unit, and the display unit being configured to output a representation of at least a part of the construction machine together with the measured values of the operating parameters, wherein at least one sensor is provided to measure operating parameters relating to interaction with other machines external to the construction machine, wherein the display unit is configured to output measured values of the operating parameters relating to the interaction with other machines.

2. The construction machine according to claim 1 further comprising a camera for recording a real-time representation of at least a part of the construction machine and transmitting the recorded real-time representation to the display unit.

3. The construction machine according to claim 1, wherein the operating parameters indicate at least one of movement of the construction machine, a function of the working equipment, operating mode of the working equipment and/or position of the construction machine in an environment.

4. The construction machine according to claim 1, wherein the measured values of the operating parameters and the representation of at least the part of the construction machine can be superimposed by the display unit.

5. The construction machine according to claim 1, wherein the display unit is configured to output, in addition to the measured values of the operating parameters, at least one target value for at least one of the operating parameters.

6. The construction machine according to claim 1, wherein the construction machine comprises a road finisher configured to heat and compact material used for road construction, and the working equipment is at least one of a drive of the road finisher, a material hopper for receiving the material, a scraper conveyor for transporting the material from the material hopper to a spreading auger, a paving screed, a heater for the paving screed or a leveling cylinder for setting an attachment point of the paving screed, wherein at least one sensor is provided for measuring an operating parameter of the working equipment.

7. The construction machine according to claim 1, wherein the display unit comprises a touch display or virtual reality glasses.

8. The construction machine according to claim 7, wherein the display unit comprises the virtual reality glasses and is adapted to display at least one operating parameter of the working equipment when the working equipment is in a field of view of an operator of the construction machine.

9. A method for displaying operating parameters of a construction machine for building or finishing a road, the method comprising:
    measuring a value of an operating parameter of the construction machine with each of a plurality of sensors; and
    outputting the measured values to a display unit, wherein the display unit outputs a representation of at least a part of the construction machine together with the measured values of the operating parameters;
    wherein at least one sensor is provided that measures operating parameters relating to interaction with another machine external to the construction machine, wherein the display unit outputs measured values of the operating parameters relating to the interaction with the another machine.

10. The method according to claim 9, wherein the measured operating parameters are superimposed on the representation.

11. The method according to claim 9, wherein the display unit comprises virtual reality glasses that display information dependent on a field of view of an operator, and wherein operating parameters of a working equipment are displayed associated with the working equipment when the working equipment is in the field of view of the operator, and/or the operating parameters of the working equipment are displayed in a list area when the working equipment is not in the field of view of the operator.

12. The method according to claim 9, wherein a real-time representation of at least a part of the construction machine is recorded by a camera and transmitted to the display unit, wherein the display unit is an interactive touch display and/or wherein the display unit represents an at least partially animated representation of at least the part of the construction machine.

13. The method according to claim 9, wherein, in addition to the measured operating parameters, target values of the operating parameters are displayed.

14. The method according to claim 9, wherein the display unit comprises an operating element with which an operator interacts with the representation and/or the measured operating parameters for controlling the construction machine.

15. The method according to claim 9, wherein the construction machine comprises a road finisher configured to spread and compact material used for road construction and which includes a working equipment that is at least one of a drive of the road finisher, a material hopper for receiving the material, a scraper conveyor for transporting the material from the material hopper to a spreading auger, a paving screed, a heater for the paving screed or a leveling cylinder for adjusting an attachment point of the paving screed, wherein at least one sensor measures an operating parameter of the working equipment.

16. The construction machine according to claim 1, wherein the construction machine comprises a road finisher, the working equipment comprises a paving screed configured to compact road making material, and the at least one sensor is configured to measure operating parameters relating to the interaction with a feeder vehicle.

17. The construction machine according to claim 1, wherein the at least one sensor is configured to measure a distance between the construction machine and another vehicle, and the display unit is configured to output the measured distance.

18. The method according to claim 9, wherein the construction machine comprises a road finisher including a paving screed configured to compact road making material, and the another machine is a feeder vehicle.

19. The method according to claim 9, comprising measuring, with the at least one sensor, a distance between the construction machine and the another machine, and wherein the display unit outputs the measured distance between the construction machine and the another machine.

20. The construction machine according to claim 1, wherein the construction machine comprises 1) a road finisher including a paving screed configured to compact road making material, 2) a compactor configured to compact the road making material applied by the road finisher, or 3) a feeder vehicle configured to provide the road making material to the road finisher.

21. The method according to claim 9, wherein the construction machine comprises 1) a road finisher including a paving screed configured to compact road making material, 2) a compactor configured to compact road making material applied by the road finisher, or 3) a feeder vehicle configured to provide the road making material to the road finisher.

22. The method according to claim 21, wherein the construction machine comprises the road finisher, the paving screed is further configured to heat the road making material, the at least one sensor measures a distance between the road finisher and the another machine, and the display unit outputs the measured distance between the road finisher and the another machine.

23. The method according to claim 22, wherein the measuring with each of the plurality of sensors comprises measuring a value of an operating parameter of the paving screed, wherein the representation of the at least the part of the construction machine output by the display unit comprises a representation of the paving screed, and wherein the display unit outputs the representation of the paving screed together with the measured value of the operating parameter of the paving screed.

* * * * *